US009228730B1

(12) United States Patent
Inbody

(10) Patent No.: US 9,228,730 B1
(45) Date of Patent: Jan. 5, 2016

(54) VARIABLE RADIUS MULTI-LAMP ILLUMINATION SYSTEM

(71) Applicant: Willa Cather Inbody, Albuquerque, NM (US)

(72) Inventor: Willa Cather Inbody, Albuquerque, NM (US)

(73) Assignee: THE UNITED STATES OF AMERICA AS REPRESENTED BY THE SECRETARY OF THE AIR FORCE, Washington, DC (US)

(*) Notice: Subject to any disclaimer, the term of this patent is extended or adjusted under 35 U.S.C. 154(b) by 7 days.

(21) Appl. No.: 14/202,743

(22) Filed: Mar. 10, 2014

Related U.S. Application Data

(60) Provisional application No. 61/778,404, filed on Mar. 12, 2013.

(51) Int. Cl.
*F21V 21/30* (2006.01)
*F21V 21/26* (2006.01)
*F21V 21/16* (2006.01)
*F21V 8/00* (2006.01)

(52) U.S. Cl.
CPC .............. *F21V 21/30* (2013.01); *F21V 21/16* (2013.01); *F21V 21/26* (2013.01); *G02B 6/0075* (2013.01); *G02B 6/0076* (2013.01)

(58) Field of Classification Search
CPC ................. G09F 13/0413; G09F 2013/0045
See application file for complete search history.

(56) References Cited

U.S. PATENT DOCUMENTS

| 3,569,691 | A | * | 3/1971 | Tracy | 362/233 |
|---|---|---|---|---|---|
| 6,210,016 | B1 | * | 4/2001 | Prineppi | 362/123 |
| 2006/0203501 | A1 | * | 9/2006 | Chen | 362/405 |
| 2006/0268558 | A1 | * | 11/2006 | Calmes | 362/382 |

FOREIGN PATENT DOCUMENTS

GB 2231948 A * 11/1990 .............. F21V 21/18

* cited by examiner

*Primary Examiner* — Jong-Suk (James) Lee
*Assistant Examiner* — Eric Eide
(74) *Attorney, Agent, or Firm* — James M. Skorich

(57) ABSTRACT

Electric lamps are mounted by lamp arms to lamp pulleys that are, in turn, mounted to a rigid frame. A motor-driven belt synchronously rotates the lamps via frictional contact with the lamp pulleys to position the lamps to optimally illuminate a target surface. The lamps can be synchronously moved from a first location outside the periphery of the frame to a second location within the frame periphery by operation of the motor driving the belt. In either location, as well as in any other location, the apparatus provides an un-impeded, pass-through opening within the frame for an un-impeded line of sight to the target surface. Furthermore, the radial distance from each lamp to the geometric center of the frame remains the same, and the lamps remain spaced equally apart from each other.

18 Claims, 4 Drawing Sheets

A
Front View

B
Side View

VARIABLE RADIUS MULTI-LAMP ILLUMINATION SYSTEM

CROSS-REFERENCE TO RELATED APPLICATION

This application claims priority as the beneficiary of U.S. Provisional Patent Application Ser. No. 61/778,404, filed Mar. 12, 2013, titled "Variable Radius Eight Lamp System," which is hereby incorporated by reference in its entirety.

STATEMENT OF GOVERNMENT RIGHTS

The conditions under which this invention was made are such as to entitle the Government of the United States, as represented by the Air Force, to the entire right, title and interest therein, including foreign rights, as provided under Paragraph I(a) of Executive Order 10096.

FIELD OF THE INVENTION

The present invention is generally related to systems for illuminating surfaces with accuracy and consistency for interaction with optical devices (e.g., cameras and sensors). More particularly, the present invention is related to a frame and lighting system usable for target illumination that includes electric lamps mounted to lamp pulleys that are in turn mounted to a frame. The lamp pulleys and lamps supported thereby are movable by a motor-driven belt, wherein the system provides an un-impeded, pass-through opening through which optical devices can interact with a well-illuminated target.

BACKGROUND OF THE INVENTION

Lamps have been used in the past to illuminate a Lambertian surface with accuracy and consistency for the purpose of calibrating sensors (e.g., optical devices). Lamps have also been used to illuminate targets or surfaces for thorough acquisition by cameras or to take measurements and readings by other optical devices, such as sensors. When the lamps are mounted to a frame, an open space between the lamps is required for central placement of optical devices. The existing illumination apparatus provides lamps that are mounted inside the frame. There are several disadvantages to this design. Firstly, although it is desirable to adjust the area being illuminated, the lamps cannot be moved, so there is no flexibility to change the area of the illuminated field. Secondly, the lamps themselves oftentimes block the line of sight for optical devices through the frame towards the target, or prevent the placement of larger devices that would otherwise fit within the frame.

Therefore, there is a need in the art for a frame and lamp system that can be adjusted to change the area of the illuminated field, which provides optical devices a line of sight through the frame to the target that is not blocked by the lamps, and which allows the use of larger devices that fit within the frame. The present invention fulfills the foregoing needs in the art.

BRIEF SUMMARY OF THE INVENTION

It is a feature of the present invention to provide a system for illuminating a target in preparation of optical interaction with an optical device, which includes a frame providing an un-impeded, pass-through opening defined by space within its inner periphery to enable the optical interaction there through.

In accordance with features of the present invention, electric lamps can be mounted by arms to lamp pulleys that can be further mounted to the frame and can be oriented by operation of a motor driven belt to synchronously move the lamps via the lamp pulleys and optimally illuminate the target surface.

In accordance with other features of the present invention, each of the lamps can be mounted to a surface of the lamp pulleys apart from said frame in a manner that extends the lamps away from the lamp pulleys. The lamps can be synchronously moved via the motor from a first location outside the frame to a second location within frame by operation of a controller, while still preserving an un-impeded, pass-through opening within the frame when fully deployed into the second location.

It is yet another feature of the present invention to provide a system that includes eight electric lamps oriented in an octagon shape via their mounting to lamp pulleys in association with the frame. The octagonal shape assures optimal lighting of a target located in front of the frame, while still preserving the un-impeded, pass-through opening for an optical device to interact with the target through the opening.

It is another feature of the present invention to provide a system for illuminating a target in preparation for optical interaction with an optical device that includes a frame having an inner surface and an outer surface and providing an un-impeded, pass-through opening defined by a space within the inner surface of the frame. The space enables optical interaction between targets located in front of the frame with an optical device located behind or possibly within the periphery of the frame. Optical interaction between the target and the optical device occurs near a center of the opening. An electric motor, a motor pulley, a belt, lamp pulleys and guide pulleys are provided in association with the frame. The belt is mounted to track outside the lamp guide pulleys and move around the periphery of the frame. The guide pulleys, if used, can also be attached to points along a periphery and within an outer surface of the frame to guide movement of the belt along the frame. The belt is mounted inside a motor pulley attached to the electric motor that cooperates to facilitate movement of the belt around the periphery on the lamp pulleys and, if used, the guide pulleys. A controller operates the motor and moves the belt in forward and reverse directions around the periphery of the frame on the lamp pulleys and the motor pulley. Electric lamps are mounted on the lamp pulleys, and each of the lamps can be attached to a lamp arm that can be further mounted to a surface of the lamp pulleys apart from their mounting to the frame in a manner which spaces the lamps away from the lamp pulleys. The lamps can be synchronously moved from a first location outside the periphery of the frame to a second location within the periphery of the frame by operation of the controller. An un-impeded, pass-through opening within the frame is provided when the lamps are fully deployed in the second location within the periphery of the frame.

The present invention, together with additional features and advantages thereof, may be best understood by reference to the following description taken in conjunction with the accompanying illustrative drawings. In these accompanying drawings, like reference numerals designate like parts throughout the figures.

DETAILED DESCRIPTION OF THE INVENTION

Figure 1:
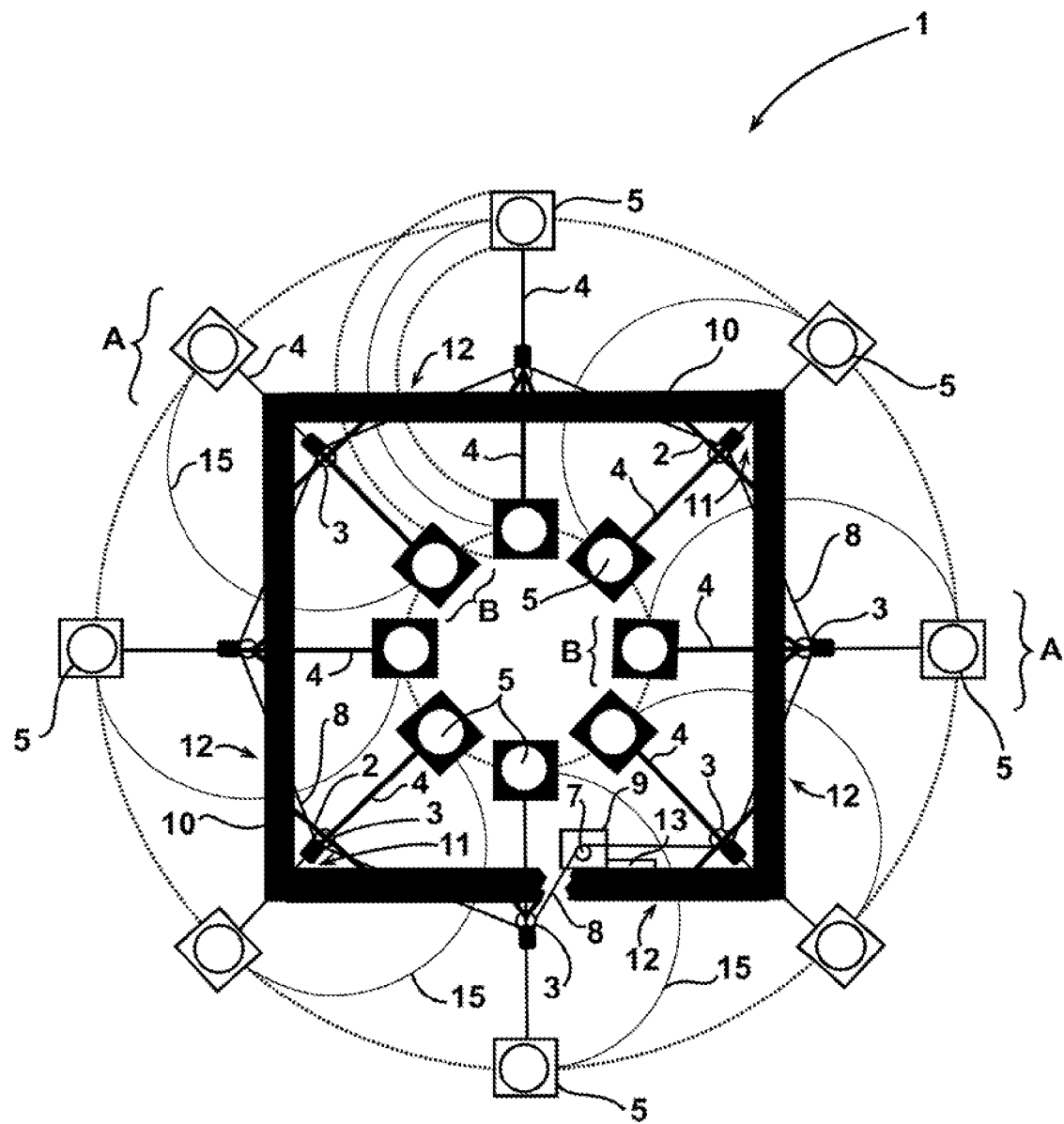
FIG. 1 illustrates components of an eight lamp frame and lighting system in accordance with features of the present invention.

Referring to FIG. 1, a frame and lighting apparatus 1 in accordance with features of the present invention is shown. A preferred structure for the present invention comprises eight electric lamps 5 that are each mounted by lamp arms 4 to belt-driven lamp pulleys 3, which are each attached to a square framed hardware system 10 (hereinafter frame 10) such that mounted lamps 5 form an octagon shape. The octagon shape is revealed if imaginary straight lines were drawn to connect each lamp 5 with its adjacent lamp 5. Lamps 5 disposed in this configuration provide optimal illumination of a surface given the overlapping coverage of the lighting footprints provided by lamps 5. A belt 8 is mounted outside of each lamp pulley 3, and is further mounted to a motor pulley 7 that is coupled to a motor 9 that can also be mounted to the frame 10.

By means of frictional contact between belt 8, lamp pulleys 3, and motor pulley 7, the motor 9 can cause the belt 8 to move forward and backward along the pulleys 3 and 7, causing the lamps 5 to synchronously move along their respective arcs 15 from a first location "A" outside a periphery of the frame 10 to a second location "B" inside the periphery of the frame 10. The lamps 5 can be moved to any location between locations "A" and "B", depending on the distance of the frame 10 to a target and the desired amount of illumination on a target or surface. In order to achieve the octagon shape, four lamps 5 and lamp pulleys 3 can be mounted to inner arm 2 mounted within the four corners 11 of the frame 10, while the other four lamps 5 and lamp pulleys 3 can be mounted at the center of each side 12 of the frame 10.

During operation, the belt 8 tracks inside the motor pulley 7 and outside the eight lamp pulleys 3. A controller 13 can be manipulated by an operator to move the belt forward and backward along the pulleys 3 and 7. Movement of the belt 8 will cause the lamp arms 4 and lamps 5 to move to various positions along their arcs 15 from the first position "A" located outside the periphery of the frame 10 to the second position "B" located inside the periphery of the frame 10. Obviously, positions "A" and "B" are interchangeable. The lamps 5 can be stored within or outside the frame 10 and the starting positions can vary. In fact, the lamps 5 can be moved along their respective arcs 15 to any positions and should maintain an approximately equal distance from each other as they are moved because they are moving in synchronicity.

Figure 2:
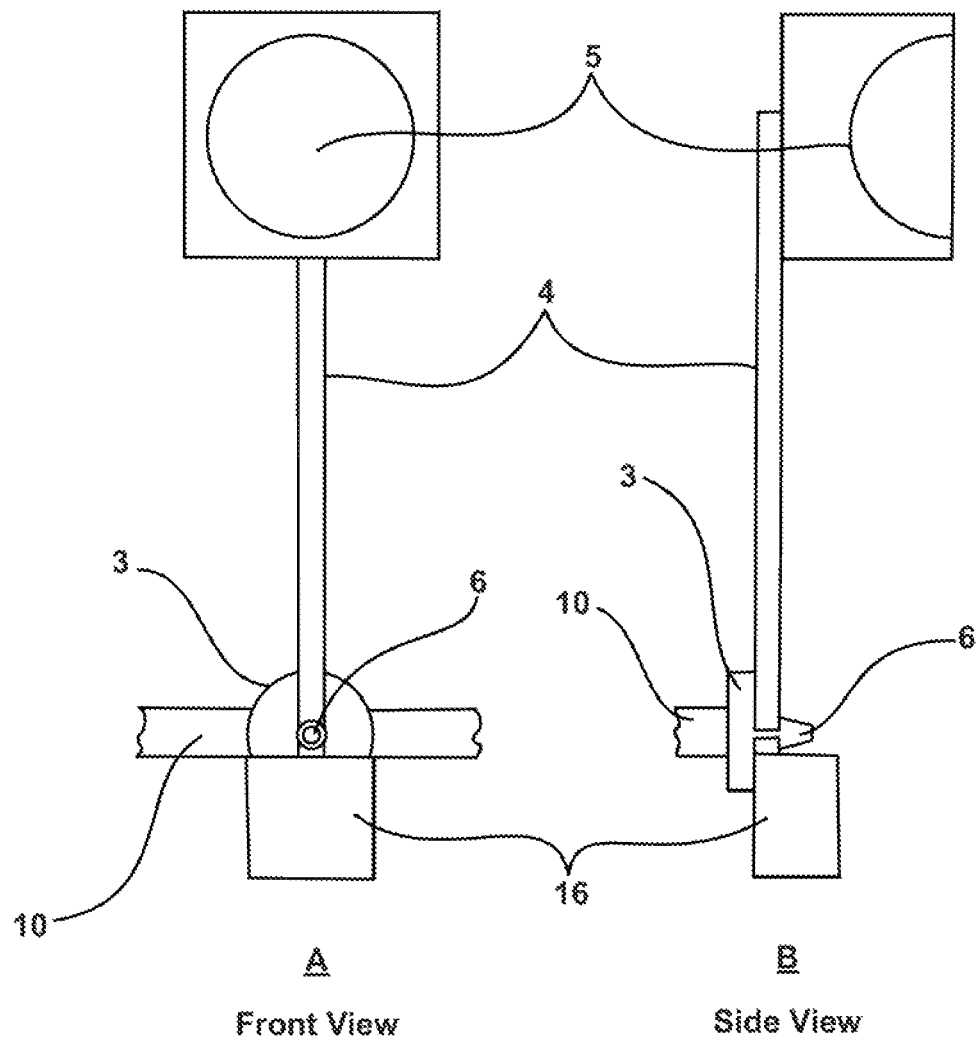
FIG. 2A illustrates a front view of an electric lamp mounted to one end of a lamp amr, with the other end of the lamp arm being mounted to a lamp pulley.
FIG. 2B illustrates a side view of the electric lamp, lamp arm and lamp pulley shown in FIG. 2A.

FIG. 2A-B comprises a close up front view (2A) and side view (2B) of a lamp 5 coupled to one end of a lamp arm 4 which, at its other end, is mounted to a lamp pulley 3. Lamp pulley 3 is shown as being directly mounted onto frame 10 is shown, although struts of various configurations can also be used to attach lamp pulleys 3 to frame 10 (see FIG. 4). A fine angle adjustment knob 6 is shown attaching (mounting) the lamp arm 4 to the lamp pulley 3. The adjustment knob 6 enables the lamp arm 4 and attached lamp 5 to be adjusted (calibrated) to achieve equal separation between neighboring lamps 5, ensuring that the eight lamps 5 remain at the corners of a regular octagon. The adjustment feature is helpful to ensure that lamps 5 do not get out of alignment due to wear of belt 8 or lamp pulleys 3. This feature can also enable an operator to achieve a different lighting pattern by adjusting all lamps 5 in the system.

The lamp arms 4 can be hollow tubes made from aluminum, although other materials are contemplated depending on the needs of a system design. A hollow tube for lamp arm 4 allows for the passage of electrical wiring for connection to electric lamp 5 to transmit electrical power. The lamps 5 can be provided in many forms, including a bulb mounted in a Spectralon® block backing. (Spectralon® is a registered trademark for optical-grade reflectance material, owned by Labsphere, Inc. of North Sutton, N.H.) A counterweight 16 can be placed on the arm 4, near the lamp pulley 3, opposite the lamp 5 to balance the arm 4 about its axis of rotation. Counterbalancing the weight of the lamp 5 by including a counterweight 16 can alleviate wear on the belt 8, strain on lamp pulleys 3 and on the motor 9, and can facilitate the movement of the arms 4.

Figure 3:
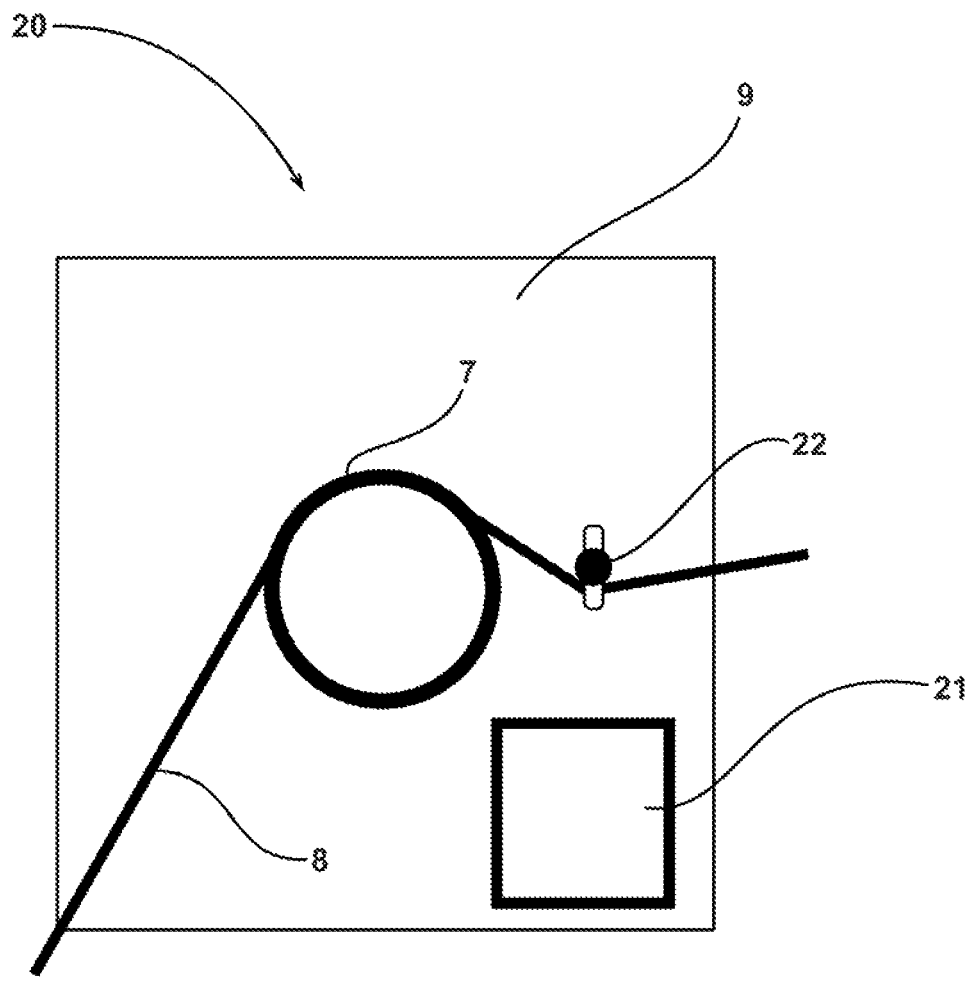
FIG. 3 illustrates a close up view of the motor assembly engaged with the belt of the present invention.

Referring to FIG. 3, a close up view of a motor assembly 20 is shown. A motor 9 includes a motor pulley 7, and its operation can be controlled via a control panel 21. A tension adjustment 22 can be provided to adjust and maintain tension on the belt 8 for proper operation of the lamp pulleys 3 and lamps 5. The control panel 21 can include a user interface (e.g., switches and a microprocessor) to enable an operator to operate the frame and lighting system 1. In its simplest form, the control panel 21 can contain a power switch, a control for setting the spread of the lamps, and a control over the tension adjustment 22 to maintain the tension on the belt 8 required for the correct spacing of the lamps 5.

Figure 4:
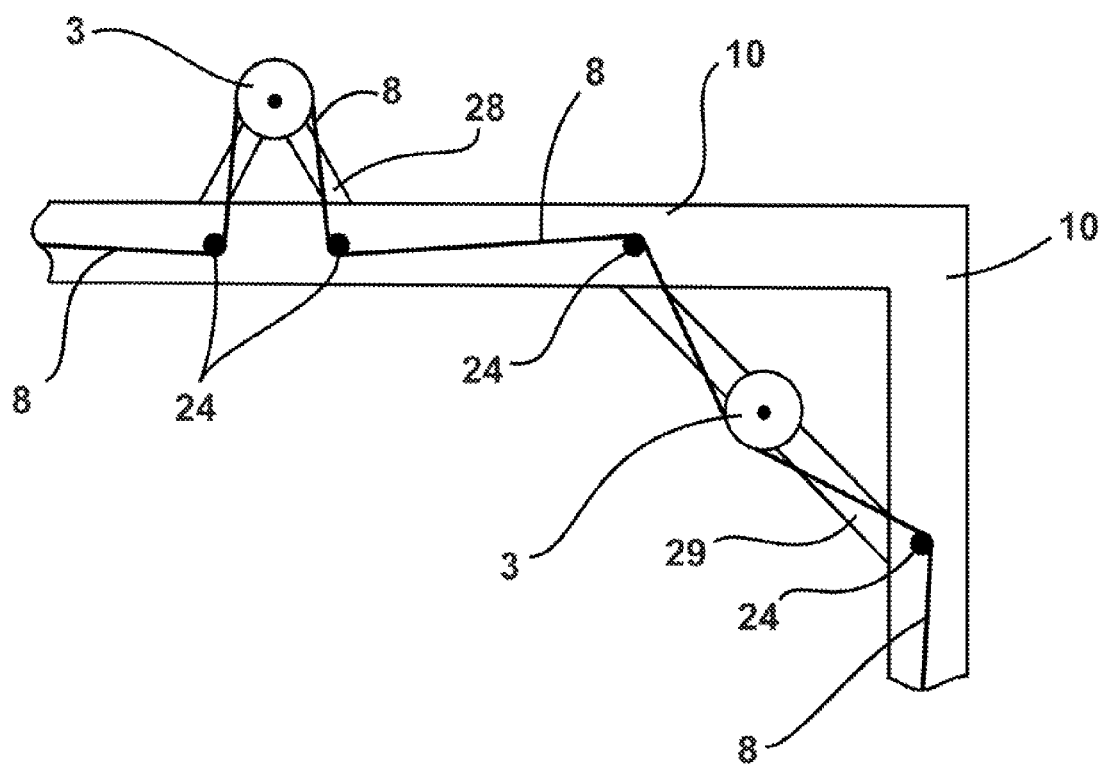
FIG. 4 illustrates a detailed view of an optional frame and pulley design that includes arm pulleys mounted to frame hardware in the form of arm mounts respectively located outside and within the periphery of a frame, and guide pulleys mounted at locations along the frame.

Referring to FIG. 4, a detailed view of an optional frame and pulley design is shown that includes lamp pulleys 3 mounted to frame hardware in the form of pulley mounts 28 and 29 respectively located outside and within the periphery of the frame 10. Guide pulleys 24 are included at points along the frame 10 to further facilitate safe movement of the belt 8. Guide pulleys 24 can guide the belt as near to the frame and pulley mounts 28 and 29 as possible, and can also allow a portion of the belt 8 to be covered by an optional safety cover (not shown). Safety covers used to cover moving belts are known in the art and can be provided in various materials. A cover can also be placed over the moving hardware (lamp pulleys 3, motor pulley 7, belt 8 and guide pulleys 24) for additional safety during use. Due to the addition of guide pulleys 24, the belt 8 travels to the inside of the lamp pulleys 3 at the corners of the frame 10, instead of outside as in the simpler design illustrated in FIG. 1.

To facilitate laboratory measurements, a principal new feature of the present invention provides an operator with the ability to change the spread of the lamps 5 from a 30 cm radius to a 105 cm radius, relative to the geometric center of the frame 10, while maintaining even spacing of the lamps 5 (on the corners of a regular octagon) along an approximately four foot square frame, which is important for achieving even illumination of a target surface. An advantage of the present swinging arm design is that it maximizes the open area on the inside of the frame for placement of a wide variety of sensors.

Additional features might include (i) angle sensors on each arm 4 to allow easier and more precise angle adjustment; (ii) instrumentation to control the intensity or brightness of the lamps 5 as part of the control panel 21 on the motor 9, or as a separate control; and (iii) covers (as mentioned above) to protect the belt 8 from entanglement with tools and limbs while in motion. There is flexibility in the placement of the lamp pulleys 3 relative to frame 10. The practical limiting cases would be (i) dispensing with outer pulley mounts 28 and attaching the lamp pulleys 3 directly onto frame 10 at the centers of each side of frame 10, respectively, and consequently extending the inner pulley mounts 29 to mount the lamp pulleys 3 more radially inward towards the geometric center of frame 10 to compensate; and (ii) dispensing with inner pulley mounts 29 and mounting lamp pulleys 3 directly on the corners of the frame 10, respectively, and consequently extending the outer pulley mounts 28 to mount the lamp pulleys 3 more radially outward from the geometric center of frame 10 to compensate.

There is flexibility in the design of the spacing control. It could be discrete, with specific presets for particular uses, or continuous, allowing finer adjustments of the spacing.

While this invention has been described with respect to various specific examples and embodiments, it is to be understood that various modifications may be made without departing from the scope thereof. Therefore, the above description should not be construed as limiting the invention, but merely as an exemplification of preferred embodiments thereof and that the invention can be variously practiced within the scope of the following claims.

The invention claimed is:

1. An adjustable lighting apparatus comprising:
   a rigid frame being square and having a geometric frame center;
   a plurality of pulleys attached to the frame, with each of the pulleys being rotatable about its own axis of rotation;
   a plurality of lamps, with each of the lamps being attached to one of the pulleys by means of a rigid lamp arm;
   a belt being in frictional contact with the pulleys and a drive pulley, wherein the drive pulley is for synchronously rotating the pulleys about their respective axes of rotation and, therefore, synchronously rotating the lamps about the axes, respectively;
   each of the lamps traversing an angle from a respective starting point when rotated;
   the lamps being at an equal radial distance from the geometric frame center and the respective angles being equal at every rotational position;
   an identical point on each of the lamps, and a locus being formed by each of the identical points when the lamps are rotated about the pulley axes, respectively;
   the loci forming respective arcs; and
   the arcs lying in a plane.

2. The adjustable lighting apparatus as defined by claim 1 wherein the pulley axes lie in parallel to each other and also lie perpendicular to the plane.

3. The adjustable lighting apparatus as defined by claim 2, wherein:
   the lamps are comprised of eight lamps; and further comprising
   a plurality of octagon lines, with each of the octagon lines respectively intersecting an adjacent pair of the lamps, and
   an octagon being formed by the octagon lines.

4. The adjustable lighting apparatus as defined by claim 3 wherein:
   the frame has four sides, and each of the sides has a geometric side center;
   one of the pulleys being attached at each of the geometric side centers;
   the frame has a periphery and four corners, with a radial line extending from each of the corners and intersecting the geometric frame center,
   four of the pulleys are inside pulleys attached to the frame by moans of inside pulley mounts situated inside the periphery, with each of the inside pulleys being attached to one of the inside pulley mounts; and
   each of the inside pulleys is respectively situated along one of the radial lines.

5. The adjustable lighting apparatus as defined by claim 3 wherein:
   the frame has four corners;
   four of the pulleys are attached to the frame at the four corners, with one of the pulleys being attached at each of the corners;
   the frame has a periphery and four sides; and
   four of the pulleys are outside pulleys attached to the frame by means of outside pulley mounts situated outside the periphery, with each of the outside pulley mounts being respectively attached to a side of the frame.

6. The adjustable lighting apparatus as defined by claim 5 wherein:
   each of the sides has a geometric side center;
   four outward lines extend outwardly from the geometric frame center, with each outward line respectively intersecting one of the geometric side centers; and
   each of the outside pulleys lies on one of the outward lines, respectively.

7. The adjustable lighting apparatus as defined by claim 2, further comprising:
   a line of sight through the geometric frame center;
   the frame having a periphery; and
   the lamps lying in between the periphery and the geometric frame center and the line of sight remaining unblocked by the lamps, when the lamps are at a minimum radial distance from the geometric frame center.

8. The adjustable lighting apparatus as defined by claim 7, wherein the lamps lie outside of the periphery when the lamps are positioned at a maximum radial distance from the frame center.

9. The adjustable lighting apparatus as defined by claim 8, wherein the line of sight is perpendicular to the plane and intersects a target to be illuminated by the lamps.

10. The adjustable lighting apparatus as defined by claim 9, wherein:
    each lamp arm has a first end attached to the lamp and a second end attached to a counterweight; and
    each of the lamp arms is attached to one of the pulleys, respectively, in between the first end and the second end.

11. An adjustable lighting apparatus as defined by claim 9 wherein the arcs form circles, respectively, having equal radii when the lamps are rotated through 360 degrees.

12. An adjustable lighting apparatus as defined by claim 9 further comprising a drive motor for rotating the drive pulley.

13. An adjustable lighting apparatus as defined by claim 9 further comprising guide pulleys attached to the frame to support movement of the belt in between the pulleys.

14. The adjustable lighting apparatus as defined by claim 9, wherein:
    the lamps are comprised of eight lamps; and further comprising
    a plurality of octagon lines, with each of the octagon lines respectively intersecting an adjacent pair of the lamps, and
    an octagon being formed by the octagon lines.

15. The adjustable lighting apparatus as defined by claim 14 wherein:
    the frame has four sides, and each of the sides has a geometric side center;

four of the pulleys are attached to the four sides at the geometric side centers, with one of the pulleys being attached at each of the geometric side centers;

the frame has a periphery and four corners, with a radial line extending from each of the corners and intersecting the geometric frame center;

four of the pulleys are inside pulleys attached to the frame by means of inside pulley mounts situated inside the periphery, with each of the inside pulleys being attached to one of the inside pulley mounts; and each of the inside pulleys is respectively situated along one of the radial lines.

16. The adjustable lighting apparatus as defined by claim 14 wherein:

the frame has four corners;

four of the pulleys are attached to the frame at the four corners, with one of the pulleys being attached at each of the corners;

the frame has a periphery and four sides; and four of the pulleys are outside pulleys attached to the frame by means of outside pulley mounts situated outside the periphery, with one of the outside pulleys being attached to one of the outside pulley mounts at each of the four sides.

17. The adjustable lighting apparatus as defined by claim 16 wherein:

each of the sides has a geometric side center;

four outward lines extend outwardly from the geometric, frame center, with each outward line respectively intersecting one of the geometric side centers; and each of the outside pulleys lies on one of the outward lines, respectively.

18. A frame and lighting system for illuminating a target in preparation for optical interaction with an optical device, comprising:

a frame having an inner surface and an outer surface and providing an un-impeded, pass-through opening defined by a space within the inner surface, the space enabling optical interaction between to target locatable in front of the frame with an optical device locatable behind the frame, wherein the optical interaction between the target and the optical device occurs near a geometric center of the opening;

a motor including a motor pulley, a belt, and lamp pulleys, wherein the belt is in frictional contact with the lamp pulleys and with the motor pulley attached to the motor, which cooperate to facilitate movement of the belt and the lamp pulleys;

a controller operating the motor, wherein the belt is movable in forward and reverse directions on the lamp pulleys and the motor pulley; and lamps oriented to illuminate the target surface and mounted on at least two of the lamp pulleys, wherein each of the lamps is attached to a lamp arm and the lamp arm for each of the lamps is mounted to a surface of the lamp pulleys apart from the frame in a manner that extends the lamps away from the lamp pulleys, wherein the lamps are synchronously movable from a first location outside the periphery of the frame to a second location within the periphery of the frame by operation of the controller, and wherein the lamps preserve an un-impeded, pass-through opening within the frame when the lamps are in the second location.

* * * * *